United States Patent [19]
Leigh

[11] Patent Number: 5,838,905
[45] Date of Patent: Nov. 17, 1998

[54] REMOTE TERMINAL OPERATION

[75] Inventor: Kevin B. Leigh, Houston, Tex.

[73] Assignee: Compaq Computer Corp., Houston, Tex.

[21] Appl. No.: 903,548

[22] Filed: Jul. 30, 1997

Related U.S. Application Data

[62] Division of Ser. No. 580,170, Dec. 28, 1995.

[51] Int. Cl.$^6$ ..................................................... G06F 15/16
[52] U.S. Cl. ................................ 395/200.31; 395/200.6; 395/200.47
[58] Field of Search ........................ 395/200.31, 200.47, 395/200.77, 200.6; 707/10; 370/229, 466, 416, 426; 455/517, 407; 379/127

[56] References Cited

U.S. PATENT DOCUMENTS

| | | | |
|---|---|---|---|
| 4,776,003 | 10/1988 | Harris | 455/407 |
| 4,804,949 | 2/1989 | Faulkerson | 340/710 |
| 5,105,183 | 4/1992 | Beckman | 340/717 |
| 5,131,019 | 7/1992 | Sheffer et al. | 379/39 |
| 5,204,768 | 4/1993 | Tsakiris et al. | 359/148 |
| 5,349,675 | 9/1994 | Fitzgerald et al. | 395/800 |
| 5,423,060 | 6/1995 | Masuda et al. | 455/517 |
| 5,428,388 | 6/1995 | Von Bauer et al. | 348/155 |
| 5,444,849 | 8/1995 | Farrand et al. | 395/200.09 |
| 5,448,569 | 9/1995 | Huang et al. | 370/95.1 |
| 5,479,493 | 12/1995 | Baker et al. | 379/127 |
| 5,515,419 | 5/1996 | Sheffer | 379/58 |
| 5,535,198 | 7/1996 | Baker et al. | 370/426 |
| 5,568,535 | 10/1996 | Sheffer et al. | 379/39 |
| 5,617,102 | 4/1997 | Prater | 342/374 |
| 5,657,375 | 8/1997 | Connolly et al. | 455/436 |

Primary Examiner—Mehmet B. Geckil
Attorney, Agent, or Firm—Paul N. Katz; Ronald Chichester

[57] ABSTRACT

A PC system uses two different kinds of terminals both of which having different architecture from a traditional PC. A first kind of terminal receives and transmits high resolution information based on a relatively low resolution transmission link. This requires that software and intelligence be distributed between the PC and the terminal itself. A second kind of terminal device receives and transmits low bandwidth information, communicating with the PC or another terminal device, within a confined wireless network, or across another confined wireless network via a wired network. The device can be used within nanocells of coverage, and can move between the covered cells.

30 Claims, 8 Drawing Sheets

Link Packet Format    602    600

| sop | start of packet (a RF pattern) |

604 ptyp  packet type
            version # (to accomodate backward compatibility in the future)
cid   nanocell ID
did   destination ID
            MSB    0:leaf; 1:base;
            bit[M:0] unary-coded
sid   source ID
            MSB    0:leaf; 1:base;
            bit[M:0] unary-coded
dtyp  data type
            link_cstat    //link command or status
            voice         //voice
            text          //information to be displayed
            cursor        //cursor key status & coordinates
            keypad        //keyboard keycodes
plen  packet length (in bytes; excluding sop, including eop) [do we really need this?]
data  data
fcs   frame checksum (for cyclic redundancy check)

| eop | end of packet (a RF pattern) |

606

Command/Status Packet

| 8-bit | 8-bit | 8-bit | 8-bit | 8-bit | 8-bit | 8-bit | 16-bit | |
|---|---|---|---|---|---|---|---|---|
| <sop> | <ptyp> | <cid> | <did> | <sid> | link_stat | <plen> | <data> | <fcs> | <eop> |

608

Voice Packet

| 8-bit | 8-bit | 8-bit | 8-bit | 8-bit | 8-bit | n* 8-bit | 16-bit | |
|---|---|---|---|---|---|---|---|---|
| <sop> | <ptyp> | <cid> | <did> | <sid> | voice | n | <..data..> | <fcs> | <eop> |

610

Text Packet

| 8-bit | 8-bit | 8-bit | 8-bit | 8-bit | 8-bit | n* 8-bit | 16-bit | |
|---|---|---|---|---|---|---|---|---|
| <sop> | <ptyp> | <cid> | <did> | <sid> | text | n | <..data..> | <fcs> | <eop> |

612

Cursor Packet

| 8-bit | 8-bit | 8-bit | 8-bit | 8-bit | 8-bit | n* 8-bit | 16-bit | |
|---|---|---|---|---|---|---|---|---|
| <sop> | <ptyp> | <cid> | <did> | <sid> | cursor | n | <..data..> | <fcs> | <eop> |

614

<data> : <key(1),x1,y1,x2,y2,...,xm,ym> // where n=m*2+1
<key> : left/right/middle, up/down Key-Pad Packet    616

| 8-bit | 8-bit | 8-bit | 8-bit | 8-bit | 8-bit | n* 8-bit | 16-bit | |
|---|---|---|---|---|---|---|---|---|
| <sop> | <ptyp> | <cid> | <did> | <sid> | keypad | n | <..data..> | <fcs> | <eop> |

<data> : <keycode(1),...,keycode(n)>

FIG. 6

REMOTE TERMINAL OPERATION

This is a division of application Ser. No. 08/580,170, filed Dec. 28, 1995.

FIELD OF THE INVENTION

The present invention describes a distributed computer technique and architecture allowing a user to remotely access computer information.

BACKGROUND AND SUMMARY

Users want freedom to move. Modern technology has facilitated portability and freed users from the restraints posed by traditionally desk-based devices. For instance, cellular telephones and cordless telephones allow a user to conduct telephone conversations from virtually anywhere. Hand-held televisions and audio equipment are quite well-known.

Current small computers typically include system hardware and user interface hardware. The standards used for this hardware are continually evolving: For example, EGA displays have evolved to VGA displays.

The inventor of the present invention has postulated that the user interface device will become more complex in order to provide better perception of the display, and a more natural and realistic interface.

The present invention has an object of loosely coupling the user interface devices to the system hardware. In doing this, the inventor found that the loose link interface operation simplifies the serial link protocol, and in so doing, enables system portability. The operation approaches independence from the host hardware and software systems. Other operations also become possible.

Laptop computers allow some degree of mobility while computing. A laptop computer, however, is a special purpose device which includes all of the necessary interface equipment for computing. A laptop often includes many computer components: the input device, display, memory, and other associated devices necessary to form a computer.

The inventor recognized that the high cost of laptop computers results from the fact that laptops typically have included every part of a computer.

Many of the users who own laptop devices also own or use non-laptop, e.g., desktop personal computers. However, many of those users employ laptops for their portable applications, and desktops for their desk-based operations.

This provides a problem of un-reconciled files between the units. For example, the laptop maintains its own set of files, as does the desktop machine. If the laptop user needs a file from the desktop machine, some kind of file transfer needs to be done. A disk or wireless (e.g. infra-red) or wired communication link is often used to transfer the files.

The present inventor noticed a number of limitations in the present PC architecture, including the following.

PC systems have increasing capabilities, i.e., performance, storage choices/sizes, communication with other PCs or different types of computers. Prices rarely, however, come down. Instead, more features are packed into a box. The inventor noticed that these fully-loaded systems often include more than is really needed by many users. In fact most such PCs use a very low percentage of their capacity.

The physical configuration of such PCs are too rigid. A typical PC can be used by the user sitting in front of a PC, and located in a relatively fixed area (e.g., study room). When a person needs to use a PC in another area (e.g., kitchen) he/she has to go to where the PC is located. Often there is not enough room to place the PC in places like a kitchen. Portable PCs, e.g. laptops, and PDAs compromise too much on the hardware/software resources, trading off, for anywhere-portability.

Many applications that would be useful for such computer applications do not require an excessively large bandwidth information at a time, but do require the bandwidth to be distributed. For example, a computer could be used in a kitchen to look up a recipe, or phonebook; in a garage to look up a car repair manual; in the yard to look up certain plant treatment information; on a couch to look up a phone number while speaking to another person over the phone; in a grocery/discount store aisle to look up a product information; etc. People need many different kinds of low bandwidth information at different locations, bounded within an area.

The inventor recognized that these needs could be met by low-resolution, and hence low cost information terminals which are replicated at various locations to provide people very light devices to carry around, but still give them access to large amounts of database information.

The present inventor has labelled these devices as legacy terminals.

These legacy terminals are intended for uses such as described above. The system configured according to the present invention includes many advantages. There is flexibility to add more users without replicating the entire system. The system is optimized for tasks including sharing of centralized data such as yellow pages, encyclopedia, shop manuals, legal references, medical records, etc. stored on CD-ROM changers or on networked drives, without replicating the data in each of a number of different computers.

The system includes networking inside the box to centralize network management within the box. This can be embodied by wireless links which are optimized according to the present invention by the special interfacing of the present invention.

The PC of the present invention can be used as the central information hub in a household (closet PC) or in an automobile (car PC).

In view of the above, the inventor of the present invention has an objective to allow information from the personal computer to be remotely accessed from anywhere within the vicinity of the personal computer.

Another objective is to allow the accessing device, which acts as the computer interface, to have less than all necessary structures for computing, to lower the overall cost of the device. In achieving this goal, the inventor noted and addressed certain problems which have prevented artisans from fully successfully effecting a portable and remote architecture. This is done according to the present invention by distributing the architecture in a new way.

One theoretically simple solution allowing remote access would be to simply extend the wires of the PC, or more generally, to extend the channel that couples the interface device to the PC. The interface device, e.g. the keyboard or display, could then be a very long distance from the computing part of the PC. However, this would require many long channels with high frequency signals passing thereover.

It is an object of the present invention to simplify this interface and simplify the link between the user interface parts of the personal computer and the computing parts of the personal computer. In order to do that effectively, the inventor discovered a way of changing the basic computer. These architecture changes, which allow effecting this operation, is also contemplated and described according to the present invention.

The preferred system used according to the present invention is a serial link or a quasi-serial link such as Firewire (TM). The serial link minimizes the number of channels which are necessary between the user interface and the computing portion.

The inventor found yet another problem. Specifically, in a Windows(TM)-type environment, for example, the screen displaying the information usually uses sixteen (16) bits per pixel, and often has millions of pixels. In order to provide information to this screen, the channel would need to carry a bandwidth having literally hundreds of megabits per second.

It is another object of the present invention to use techniques that allow communication between computer parts that reduce this necessary bandwidth. This is done by modifying the computer architecture in a way that allows separating different portions of the computing system. A serial link between the computing portion and the display portion is configured to allow low-bandwidth signals to be communicated in a way that commands higher information content signals to be displayed. More specifically, the present invention teaches a low bandwidth serial operation between parts of a computer. The term "low bandwidth" as used herein indicates that the communication between these parts carries relatively less information than the higher information-content signals, e.g., those signals which are displayed on a display screen.

It is another object of the present invention to enable wireless operation so that a PC user can access information from a PC in any area.

It is another aspect of the present invention to allow multiple user operations on a single PC by communication over this lowered-bandwidth channel.

BRIEF DESCRIPTION OF THE DRAWINGS

These and other aspects of the invention will now be described in detail with reference to the accompanying drawings, wherein:

FIG. 6 shows simplified information packets used according to the present invention;

DESCRIPTION OF PREFERRED EMBODIMENT

The system used according to the present invention uses two basic types of remote units to communicate with a central processing unit, the "PC".

"Legacy" interface units are currently standard in the industry. They include elements such as a high resolution graphics display, a mouse, a keyboard, a video camera and the like. These units communicate commands that require display and/or manipulation of relatively high bandwidth information. The present specification defines these units as graphics devices. The legacy devices carry out input and output ("IO") using highly detailed information.

The present invention also communicates with devices that process information which has a lower level of detail. These devices are commercially available, but are not currently standard in the PC industry. The present specification refers to these devices as "character" devices. These character devices have low resolution, and hence are low cost devices. These devices communicate lower detail information.

One preferred character device is a low resolution display which is 20-characters wide and 10-rows wide. Such a device has sufficient resolution to display text, but is not suitable for graphics. Another character device is a sound or voice system.

The character devices according to the present invention include less control electronics and bandwidth than the Legacy devices. For example, the character devices might have one quarter of VGA resolution. The received signal in the character device might be processed without significant additional operations within the character device. Preferably, the character device reproduce the information they receive directly, without processing the information in a way to change its content. One example of such a minimal processing character device is a communication device which transmits sound from one non-controlled electronics terminal to another.

Figure 1:
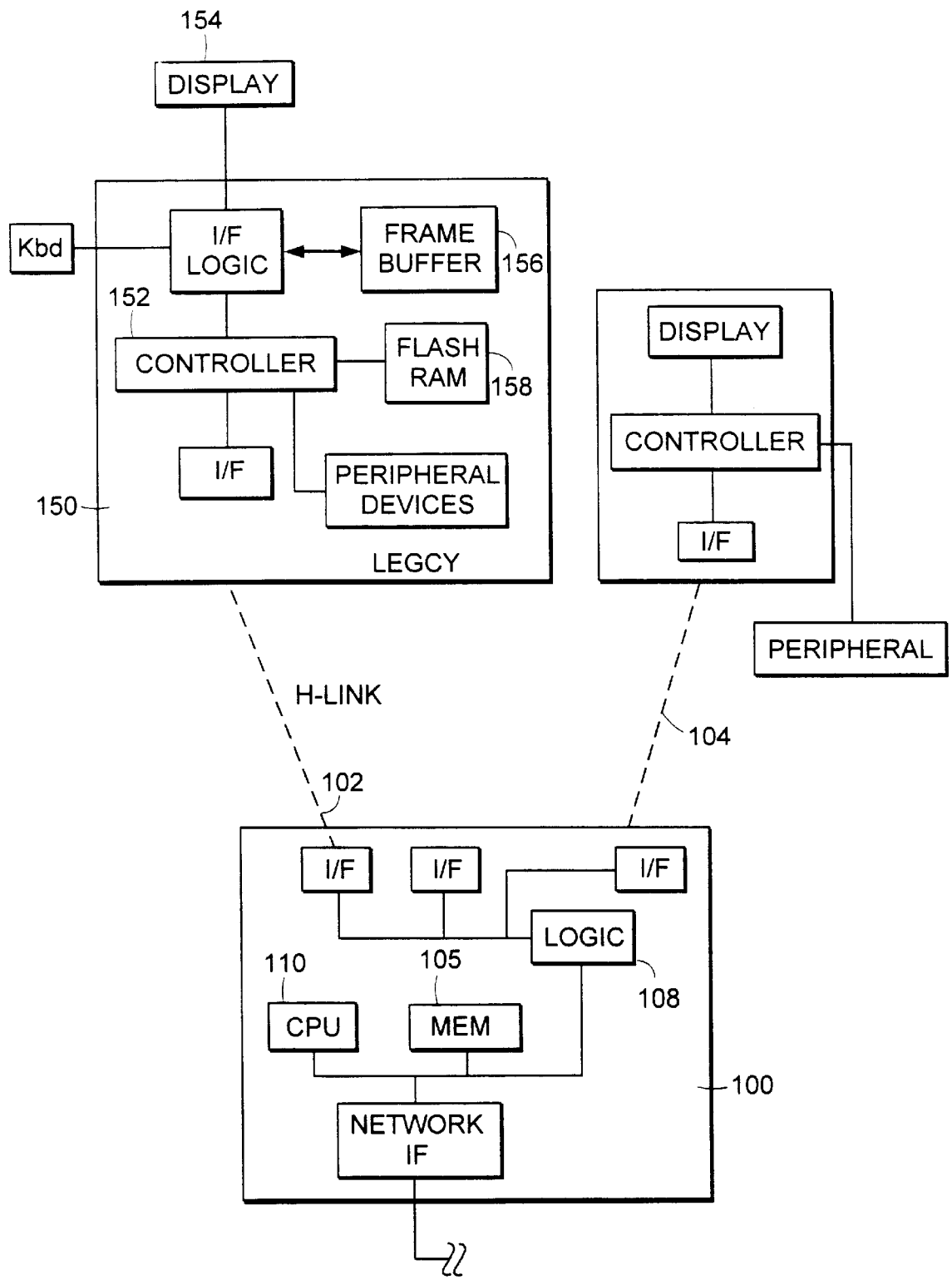
FIG. 1 shows a basic block diagram of the basic hardware of a unit of the present invention.

The block diagram of the basic system of the present invention is shown in FIG. 1. Personal computer 100 includes at least Legacy device interface H-link 102 and the lower information content character interface L-link 104.

Interface 102 is the link to the legacy terminals. This embodiment changes the architecture and operation of the personal computer in a way that simplifies this interface and lowers the amount of information that this channel needs to carry, its "bandwidth".

The inventor investigated simply serializing the data. However, he found that this would require too much bandwidth. His next idea was to move the subsystem controller such as the display controller, into the external device. This still required a 50 to 60 MBytes/sec bandwidth—still too much bandwidth to allow reliable serial communication at a reasonable cost. The inventor decided that the interface should be located a step even further back, actually within the software layer (e.g., the GDI layer).

According to this aspect of the present invention, a first part of the software runs within the PC 100. A second part of the software runs in the external device 150. The functions are divided as follows. Part of the application, e.g., data processing, file storage and interfacing to traditional networks are done in PC 100. The computations for creating images, formatting screen, and determining positions on the display, however, are carried out in the external unit 150.

Figure 8:
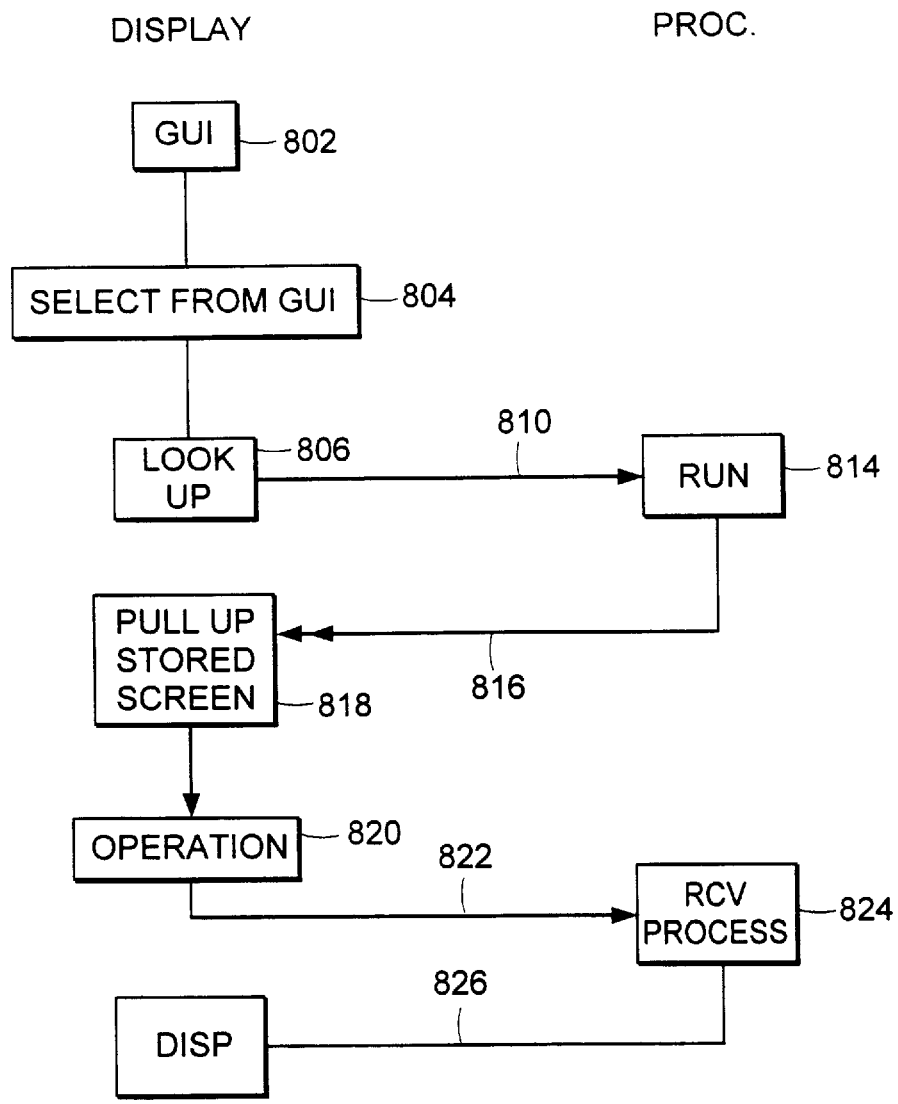
FIG. 8 shows a flowchart of operation of the basic unit of FIG. 1.

This embodiment preferably operates in a multi-threaded environment such as a WindowsNT(TM) environment. The flow of operation is shown in FIG. 8. The display in this operation functions as a "graphical user interface", and displays all options from which the user can choose on display screen 154, step 802. The operating system controls the display on the screen—but literally millions of bits of information are displayed on the screen 154. These bits are all stored locally, in the frame buffer 156 of the external unit 150.

The external unit of this embodiment stores this information to be displayed. A graphics icon is stored for every program that can be executed. Graphical information indicating menus, their contents, and their positions are also stored.

The menu and its operation is hence based on information that is stored locally. The input and output operations for that menu operation are also done locally. For example, if the user selects icon x by double clicking, the location of the cursor is reported to the processor 152, which is running a GUI program, at step 804. The GUI looks up the coordinates of the location of the mouse at step 806, to return a code 810 representing mouse double click on icon object #8. According to this embodiment, one portion of program y is then processed by processor 110 according to a program stored in memory 105.

This command could be parsed as "Mouse double clicked on icon object 8", rather than continuously sending the mouse movements to the CPU as done in a traditional PC. There is less information in this command, which can hence be converted to a relatively low bandwidth command that can command the program to be executed.

Certain actions are carried out in a totally local manner. For example in a WindowsNT environment, an icon can be moved to other locations on the screen where only the new final coordinates are sent to the PC 100 rather than the intermediate coordinates while the icon has been dragged. PC 100 only keeps the records of commands sent to the display. The program on PC 100 operates independent of the display, and only provides instructions to the display, and receives instructions from the display.

At step 814, processor 110 in PC 100 begins running the program y. The program y commands bringing up the appropriate display on graphics display 154.

Graphics unit 150 stores the graphical images indicating the screen. Communication 816 from processor 110, therefore is parsed as "Pull up the stored basic screen for Program y". Unit 150 receives this low bandwidth command, and retrieves and displays the screen contents locally at 818. That local display can be customized for the user in any desired way.

Assume, for example, that program y is a spreadsheet. Now, at step 820, the user has commanded a number be added into position 1,2. Unit 150 parses this into: "enter '3' into position 1,2". This is received and processed at 824 to return a parsed command 826: "Display 3 in position 1,2. Change position 1,3 to display 8". This latter command assumes that the new number changes a total or some other aspect of the screen. Note that the user's customization— e.g. size of the displayed spreadsheet, color of lines, etc—do not effect this parsed command.

According to this embodiment, therefore, PC 100 stores the basic file in its own memory. Graphics unit 150 stores the basic templates for the display, and receives commands to change the contents of that display. The templates are stored within non-volatile memory (e.g., Flash Ram 158). That display is stored within the video RAM of graphics unit 150, and its contents are changed by values which are received by PC 100.

A similar operation is carried out between PC 100 and graphics unit 150 to do other functions. For example, PC 100 can call up a stored spreadsheet from its memory. The called-up file is parsed into subcommands which include information such as the x and y coordinates of various information and the information itself in the spreadsheet environment.

By appropriate modification of the software and storage capabilities, a relatively low bandwidth link is formed between the processor portion 100 and the display portion 150. This requires, however, that the processing which is usually done entirely in the PC be done partly in the graphics unit—especially the display processing in this example.

Accordingly, the architecture of this low bandwidth operation enables lowered communications bandwidth by carrying out processing at two separated locations: both in the external device, and in the PC.

Almost all applications nowadays are written in layers. An Application Program Interface ("API") layer is written for the applications, e.g., spreadsheet, word processor interface, etc. A Graphical Device Interface ("GDI") layer is used to communicate with the API routines to interface indirectly to certain device drivers, e.g., display. The present architecture takes advantage of these layers.

The controller 152 of the present invention executes the instructions received from the host 100. This controller is preferably an X86 type CPU, although it can alternately be any other kind of CPU. Instructions are passed from the host 100 to the external unit on H-link 102. This serial link can be wired or wireless depending on the cost to implement.

Multiple terminal support is carried out in logic element 108. The "networking" of multiple terminals is moved inside the host box rather than on the H-link. The purpose is to keep the H-link as simple as possible (i.e., point-to-point).

The present invention is much more efficient than X/Windows was designed for [any host⇌any terminal]. The inventor recognized that this unnecessarily complicates the protocol overhead. The invention provides [one host⇌any terminal]. Another important feature of the present invention is its point-to-point control between a host port and a terminal. The multiple terminal support is done inside the host, unlike in a traditional network (e.g., Ethernet), where the networking of multiple devices are done on the wire.

The layers of the computer operating software for this application therefore runs in both the PC 100 and in the external device 150. More generally, the software for the same application runs in first and second separated parts of the computer unit. This operation will be even further enhanced in the standardized GDI layer of future Windows OS. With a standardized GDI layer, a set of IO devices are loaded within the external unit (e.g., SVGA display), and GDI codes and IO devices are "loaded" inside the external unit at the factory. GDI and device drivers can also be updated, if necessary, via the serial link.

The character devices are quite different than the Legacy devices. The character devices are inherently lower resolution devices. This lower resolution information can be more easily transmitted over the serial link.

A first preferred character device is a text-only display as described above, for example, a segment type display. Information is downloaded to the display from the PC which can be parsed as "Turn on segments 1, 3, 5, 7 and 9" to display an S. The segment display, therefore, would need minimal intelligence. It only needs to receive the information about which segments are to be turned on, and operate accordingly.

Another character device 170 is intended for reproduction of audio. The audio system also uses a device which carries out all processing in the PC. The character device 170 receives and decodes the information. All electronics for the audio is part of the PC. The audio is created and coded, for example, into a frequency modulated form. The character device 170 receives and demodulates the audio and then amplifies the received information and plays it.

The above has described low quality audio, such as would be transmitted over a low bandwidth channel. High quality audio can also be used according to the present invention, but such high quality audio would be transmitted to a legacy type device by separating the layers of instruction data. For example, the legacy device is a sound card of the wave-table type. The commands transmitted to the sound card could be parsed as reproduce sounds using wave-table elements numbers x and y, at tone z and using the following envelope. Another parsing for FM type sound cards would simply transmit the information which will be frequency modulated.

The interface for the character devices is simpler than the legacy devices. Furthermore, the information bandwidth required between a character device and a PC is a lot less than the bandwidth of a graphics device.

Hence, the multiple character devices can be networked on an L-link 104, whereas only one graphics device is connected to an H-link 102.

The serial link for the character devices support digitized voice data as shown in FIG. 6. The link used therein includes the capability to support stereo hi-fi data among the packets for the wireless link. The wireless link can be 900 MHz, 2.4 Ghz or other ISM bands.

One important reason for simplifying the serial interface is to allow wireless communications.

Figure 2:
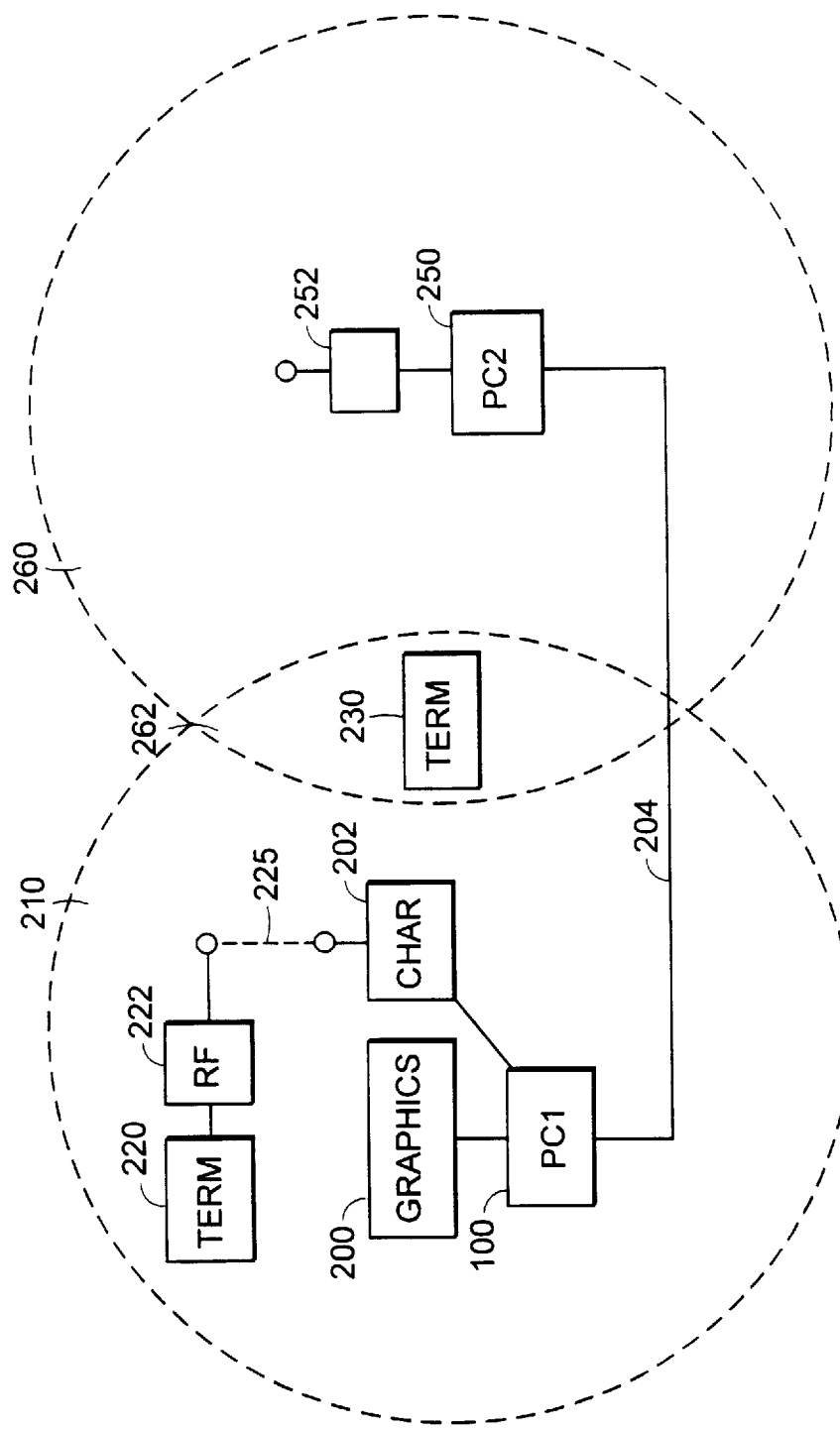
FIG. 2 shows the terminals communicating within a nanocell in the present invention.

The preferred mode of operation of the present invention uses cells of coverage referred to herein as nanocells. The basic nanocell architecture of this invention is shown in FIG. 2. The host PC 100 includes RF transceivers 200, 202. Character RF transceiver 202 transmits the low bandwidth output.

Host PC 100 is connected to a second host PC 250 via an Ethernet link 204 or by any other conventional network connection. Any terminal, character or legacy, can be located anywhere within any of the nanocells.

FIG. 2 shows two PC systems. PC #1 100 forms a first nanocell 210. PC #2 250 also includes its own transceiver 252 which forms a nanocell 260. The two nanocells overlap at the area 262.

Terminal device 220 includes an associated RF transceiver 222 which is capable of communicating with the graphics transceiver 200. One local handshaking technique that facilitates use with multiple terminal devices is described herein.

Terminal 220 is shown within the nanocell 210, and hence is within range of the transceiver 202. During this time the communication between 220 and 202 occurs over the channel shown as 225.

The operation preferably takes the form of a token type scheme. In this scheme, all devices switch to a control/configuration channel and wait for instructions from the base, which here is embodied by PC 100. PC 100 periodically passes the token between all of the different communicating devices. The device which has the token can get a chance to issue a request. The device receives an answer to its request in the form of an execution instruction which will, if necessary, include a channel number on which to operate.

The information exchange occurs over the data channel after the proper channel has been chosen.

Figure 3:
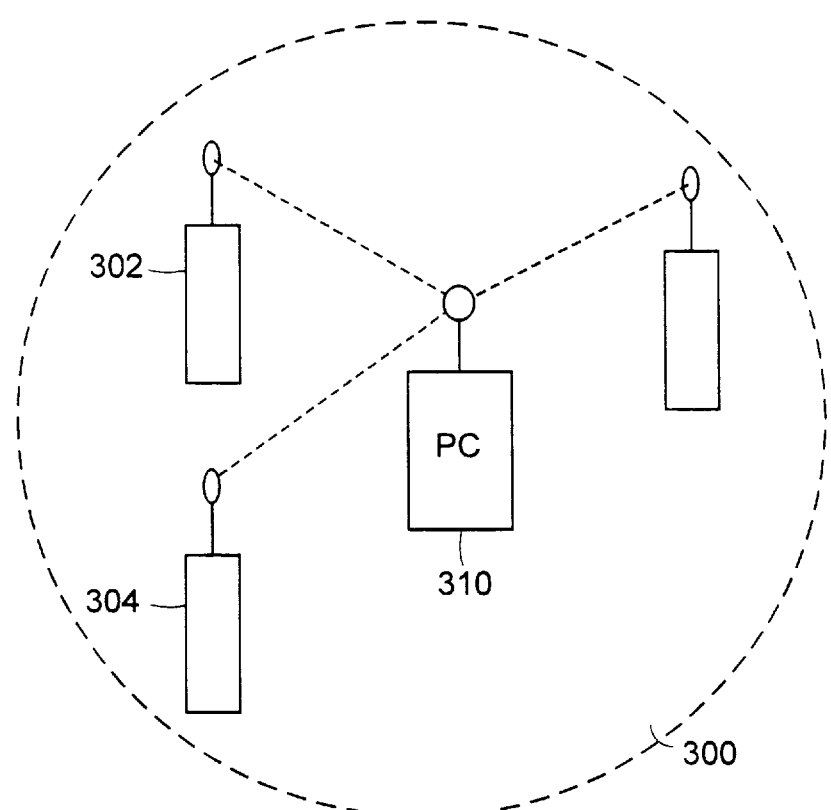
FIG. 3 shows a PC communicating with multiple terminal devices.

One important feature of the present invention is the ability to allow multiple user operations. Multiple terminals can be located within a single nanocell. FIG. 3 shows this scenario where terminals 302 and 304 are all located within the nanocell 300.

Personal computers have traditionally been single-user devices. However, more sophisticated processors such as the Pentium and the Pentium Pro clearly have sufficient processing capability to allow them to support more than a single user. Operating systems such as Windows NT supports true multitasking environment where multiple programs can run "simultaneously" (from the user's perspective). Citrix, Inc. has proved that multi-user operations under the Windows NT operating system can operate properly. Existing environments that use Citrix's software are based on X-Windows and/or traditional networks (e.g., Ethernet). The system of the present invention makes it even more possible and more cost effective to use multi-user operations on a single PC. It is well known that a large part of a computer's time can be spent processing the IO operations such as display processing. The external terminals of this embodiment, however, process the IO operations in the external terminals themselves. This gives the processor in PC 100 even more time to process multiple user requests.

Figure 4:
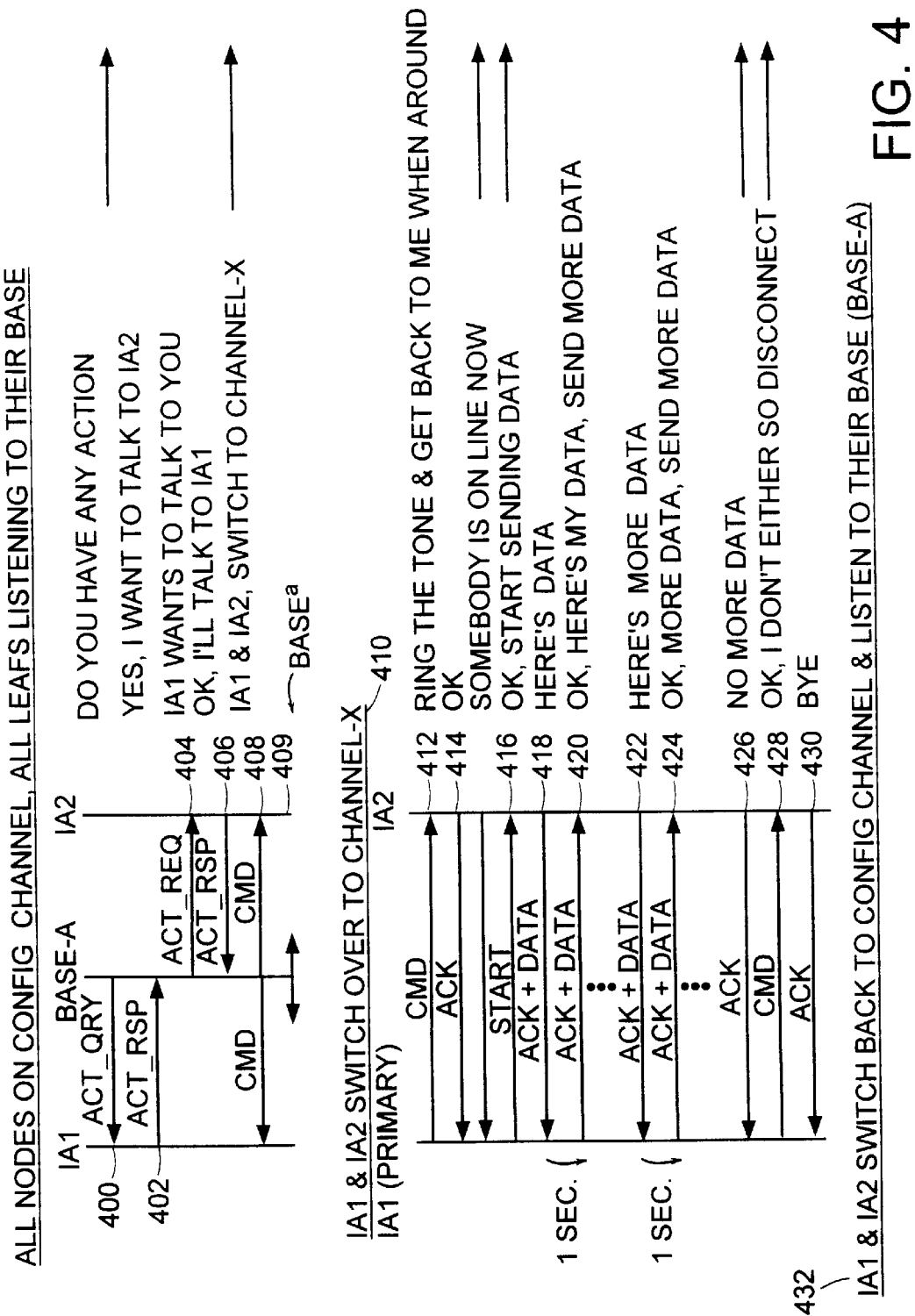
FIG. 4 shows the token passing operation and channel-switching operation used for communicating according to the present invention.

The operation is shown in more detail in FIG. 4. The operation in FIG. 4 consists of a communication which ends up allowing two character terminals to directly communicate with one another over a specified channel.

Device Registration is preferably carried out as follows. All character terminal devices are shipped with a guest ID (all bits in the device ID being zero). Additionally, the nanocell ID and the host ID are also all zeros. The nanocell ID and the host ID are written with new bit patterns after a terminal device has gone through a registration process which is used to register a new device to operate with a host supporting one or more nanocells. As explained herein, however, a terminal can be "active" within one nanocell at a time.

A terminal device uses a guest-ID in order to operate in a different and previously unused nanocell. The guest ID is different from the nanocell-ID where the terminal is registered. That is, when a terminal device is first used (after the purchase), or when a terminal device is taken into a different nanocell (e.g., at a friend's house), the guest ID is used by the device.

Registration Procedure progresses as follows. The simplest case is when only one terminal device needs registration within a nanocell. This and other similar operations are shown with reference to FIG. 4. The host first broadcasts on the configuration channel a query—"do any guests want to register?" This broadcast occurs periodically after all the registered devices have had the chance to get a time slot on the configuration channel. The new terminal device issues a guest ID and the host communicates with the device to establish either a temporary ID or a permanent ID, depending on the host setting and the terminal request. After the registration, the device becomes a registered device and the host puts this registered device on the list so that it receives the token in its order.

If there are more than one new terminal devices wanting to register at the same time, a Carrier Sense Multiple Access/Collision detect (CSMA/CD) (a random delay is used by each terminal device after each collision is detected) protocol is used to eventually let only one device win the channel to go through the registration process. The rest of the devices then compete for the configuration channel again during the next time the host asks for "any guests?"

The FIG. 4 time chart begins only after the host has established all the terminals within its nanocell range, i.e., the host knows the ID's of all the devices within the nanocell range. There is preferably no explicit "token" being passed around, and instead a scheduling system that resembles "token" ownership is used. This means that a terminal will not begin issuing commands/requests unless it is asked by a controlling node (e.g., the host or the base).

All of the following actions 402–409 take place on the configuration channel-A. At step 400, the base PC asks terminal 302 ("IA1"), 'do you have any action'. This action query is answered with an action response at step 402. The response may be "yes I want to talk to IA2." At step 404 the host computer tells terminal IA2 that IA1 wants to talk. IA2 responds at step 406 saying OK. Step 408 comprises commands from the base to IA1 and IA2 to switch over to channel X where IA2 (the initial requestor) being assigned "the Primary" by the base. IA1 and IA2 then switches over to the data channel X and starts step 410.

At step 412, IA1, which was designated as the primary, initiates the connection with terminal IA2. An acknowledgment is received at step 414. At this point, there may be no users at terminal IA2. If that is the case then IA2 waits until a user starts using the system, e.g., the user speaks into the microphone or touches a button. If no activity happens on IA2 for certain period IA1 will timeout IA2, and both IA1 and IA2 then return to the configuration channel. The host resolves how to handle this condition after IA1 and IA2 respond with their status. The above represents an intercom example of one user paging another user.

At step 416, IA1 indicates that a user is on the line. IA2 acknowledges at step 418 with data (e.g., voice). At the end of the data packet, IA1 acknowledges back to IA2 with a response data. This can continue for additional data steps 422 and 424. It will, in fact, continue until both terminals agree at step 426, 428 that they have no more data to communicate, or when the timeout period initiated by IA1 has expired.

At step 430, the disconnection is confirmed followed by step 432 at which both terminals switch back to the configuration channel and listen for a poll from the base.

Figure 5:
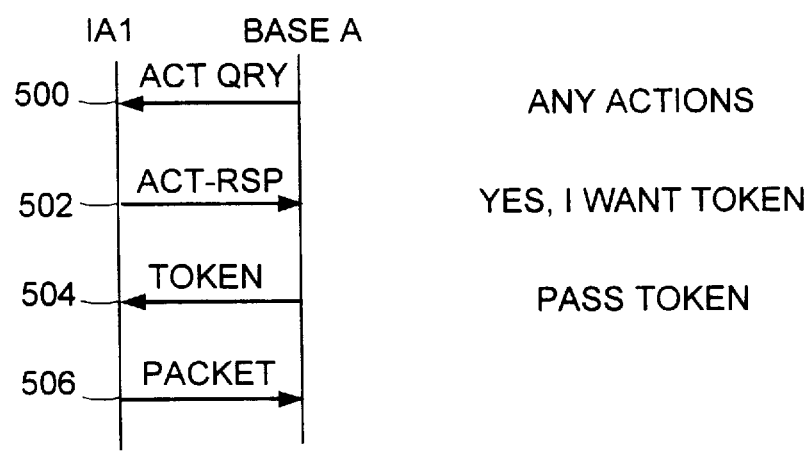
FIG. 5 shows token passing as used according to the present invention.

The above has discussed a character operation. A graphics operation using this technique is also possible using a wireless technology to implement a network of H-links. This operation is shown in FIG. 5. At step 500, the base queries terminal IA1 asking if there is any action to be performed. At step 502, terminal IA1 responds with an answer yes saying that it wants the token. Base A responds at step 504 by passing the token to IA1. IA1 then responds with a packet. The packet at step 506 is of the form shown in FIG. 6. Multiple graphics units can send packets in this way, facilitating multiple user operations.

FIG. 6 shows the packet format for various data types which can be used according to the present invention. Each packet has the general form shown in 600. The packet starts with an SOP pattern 602 which is an a start sequence (e.g., a RF pattern). This RF pattern can be, for example, a unique reserved sequence not found in any data operation. The actual data itself is shown in 604. It includes a packet type which includes a version number provided to accommodate backwards compatibility in the future. A nanocell ID describes the nanocell (here 300), and a destination ID describes the destination, (here the base). The source ID define the source of the communication, and the data type defines the kind of information that will follow. This is followed by the packet length, then the data, and then a frame checksum for a cyclic redundancy check. The entire packet ends with an end of packet pattern 606 which is also another reserved sequence.

The different kinds of packets are shown in FIG. 6, with a command status packet shown as 608, a voice packet shown as 610, a text packet shown as 612, a cursor packet shown as 614, and a keypad packet shown as 616.

It should be understood this operation can be carried out in a time/division multiplexed fashion, or can be carried out on separate channels. Time-division multiplexing method is used on the configuration channel. Pairs of devices can communicate simultaneously on the data channels. When there are not too many devices for a designed channel bandwidth, separate data channels are not necessary, i.e., all the character devices can communicate over one channel. This facilitates use of low-cost devices.

The hand-over protocol includes two phases: A first phase To establish a condition to hand-over (or receiver-over) of a terminal, and a second phase to actually hand-over (or receive-over) the information context, in essence, the terminal.

Another important feature of the present invention is the ability of the devices to move between nanocells.

FIG. 2 shows two nanocells 210 and 260. The terminal 230 is moving between those nanocells. At the time shown in FIG. 2, terminal 230 has reached the position of overlap between nanocells 210 and 260.

Figure 7:
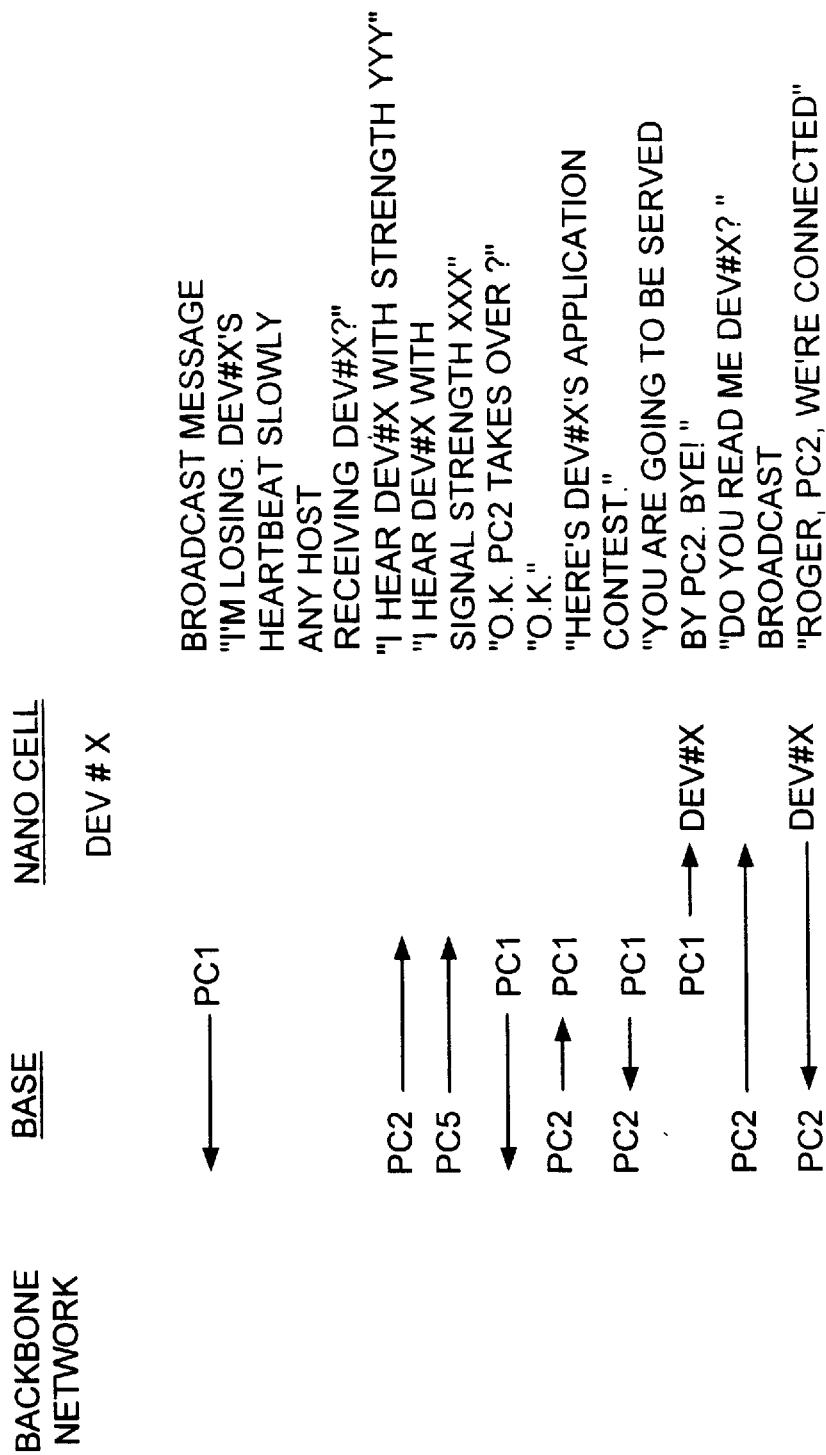
FIG. 7 shows the communication operation leading to a switch-over between nanocells.

FIG. 4 shows the configuration channel and polling operation for two channels IA1 and IA2. Step 409, shown in FIG. 4, represents the base station sending out a general request for additional terminals. This operation is shown in more detail with respect to FIG. 7.

In the FIG. 2 environment, terminal 230 has been in communication with RF transceiver 200. RF transceiver 200 therefore includes terminal 230 in its list of terminals with which to communicate. Step 409 represents the base sending a general command to all base stations which have addresses other than those in its registry, i.e., "is any guest (i.e., anyone other than the previously-addressed terminals) out there?". If any guest terminals are out there, they respond at step 702 with a packet which includes their address. If more than one new terminal enter a nanocell at any time, However, it is possible to use known techniques (e.g., CSMA/CD) to allow multiple terminals to enter a nanocell at once. Such techniques are typically used for cellular telephony.

Terminal 230 knows that it is communicating with PC 100. Therefore, when it answers PC 250's poll, part of that answer includes an indication that terminal 230 is already communicating with PC 100. Now, PC 250 sends a communication to PC 100 over the backbone network 204 indicating that it has also established communication with terminal 230. This allows the PC's 100 and 250 to cooperate in handing-off the terminal 230. The polling operation continues until terminal 230 loses communication with PC 100. At that time, terminal 230 is added to PC 250s permanent registry, and then communicates with PC 250.

The above has described the basics of the terminal operation. Different hardware/software can add different functional aspects to the system. For example, the hand-off protocol will still work if a handset is moved between two non-overlapping nanocells. In this case, the handset will not be operating off any host while it is out of range from both hosts.

One preferred application uses the low bandwidth link to communicate among audio handsets as established by the handshaking routine of FIG. 4. The application shown in FIG. 3 uses audio handsets 302, 304, all communicating on their appropriate links on the PC 310 according to FIG. 4. The link needs to have enough bandwidth to support psuedo full-duplex (perceived by the users). To allow each of the handsets to hear the others, both the transmitter and receiver need to be on the same frequency.

The interleaved packet structure includes, as shown, a start area, a header, data and an end area. The maximum length of a packet is predefined in a way that not one terminal will consume a time slot too long. Each sub-packet can include a parity bit or cyclic redundancy check (CRC) data. Those having ordinary skill in the art understand how such a system would be used for communications. An alternative operation would use the base as the repeater to receive from the transmitting terminal on one frequency and retransmit the packet on another, enabling a true full-duplex operation. As described above, the software flow includes objects whose properties in the terminals are duplicated in the host. The host knows according to the present invention when it is commanding the terminal. Alternately, the terminal can report to the host when the host requests a response under certain circumstances. Two examples are described herein to explain how this would work.

In the animation example, we want to move object A in the XYZ direction. This is done by using a move algorithm. For example, a move algorithm could command the object to move with any desired object. The move algorithm could also command a stop if the object of property K has collided, for example.

The spreadsheet example uses a host and terminal which carries out different operations as explained herein. The host controls the user commanding and creating the table at step 802. This includes drawing grid table with attributes A, B, C and D for example. The terminal creates the table and display by creating table cells and mapped display. Once done, the terminal returns an indication that the operation is completed. If necessary, the host then tells the terminal to take some action such as record or display a keystroke. Closer movements are also reported back to the host from the terminal. The terminal carries out operations including sensing movements, drawing cursors and sending the cursor coordinates. The host subsequently sends new information, such as display the summed value, in cell IA3. The terminal responds by displaying the keyboard entry in cell IA3 in the predetermined font.

Although only a few embodiments have been described in detail above, those having ordinary skill in the art will certainly understand that many modifications are possible in the preferred embodiment without departing from the teachings thereof.

For example, a terminal device can "piggy-back" or can support (as a plug-in module) a different type of device, e.g., a cellular phone, because the terminal device is a light-weight, small form-factor user-interface device (with a battery).

The wireless technology can be used to implement H-link nanocells. However, current cost benefit analysis dicates that the L link should not be burdened with the higher bandwidth requirement of the H link. Therefore, a separate technique should be used for the H link.

Another modification is for a terminal to take a different form factor than an handset, such as a wall mount or a headmount. Similarly, the input devices for a terminal can be a touch pad overlay on the terminal display, a number of push button keys, a data glove, a microphone or the like.

All such modifications are intended to be encompassed within the following claims.

What is claimed is:

1. A method of operating a distributed computer system, comprising:
preparing computer operating software which is divided into a plurality of functional layers;
operating a first layer of the computer operating software carrying out a first application in a first unit;
operating a second layer of the computer operating software carrying out said first application in a second unit, remote from the first unit;
communicating an instruction level command from the first unit to the second unit, said instruction level command being based on an operation of the software operating at the first unit;
receiving said instruction level command at the second unit; and
operating the software at the second unit based on the received instruction level command to thereby take some action at the second unit based on said software operating in said second unit.

2. A method as in claim 1, wherein said second unit is a display device and said first layer operating step comprises determining a command that is indicative of a display that is stored in said second unit to be displayed at a current time,
wherein said second layer of the computer operating software retrieves information which is indicated by said command, and displays the information on said display device, and
wherein said command carries less information than an amount of information which is displayed on the display.

3. A method as in claim 1, wherein said command is to pull up a stored basic screen for said first application.

4. A method as in claim 1, wherein said first unit is an IO device, said first layer operating step comprises determining, based on user action and based on said first layer of the computer operating software, a current routine to be executed; and
communicating an instruction indicative of the routine to be executed to the second unit;
wherein the second unit receives the instruction and uses the instruction in conjunction with said second layer of the computer operating software to execute the routine stored in said second layer of said computer operating software based on said instruction.

5. A computer system, comprising:
a base computer, including a processor, a memory, and a wireless interface portion, said base computer including a software program running thereon;
an IO unit, including a processor, a memory, and a wireless interface portion, said IO unit including a software program running thereon;
an element establishing an instruction level command link between said base computer and said IO unit;
wherein said IO unit processes a received instruction level command by retrieving information from its software program and memory and carrying out an IO operation on said information,
and said base computer includes an element which processes the same said instruction level command by retrieving information from its software program running thereon and processes said command to run or modify a routine therein.

6. A computer system as in claim 5, wherein said IO unit is a display, and said instruction level command is a command to display a particular screen which is stored as part of said software program in said IO unit, said IO unit including an element which retrieves said stored information from said memory and displays it.

7. A computer system as in claim 5, wherein said instruction level command is a command to execute a routine chosen from a menu on said IO unit.

8. A computer system as in claim 5, wherein said element includes first and second interfaces on the base computer, respectively providing different kinds of information thereon.

9. A computer system as in claim 8, wherein said first interface is a connection to a high resolution display terminal, and said command produces a display on said high resolution display terminal which has more information content than the command.

10. A computer system as in claim 9, wherein said second interface is a connection to a low resolution display terminal, and said command produces a display which includes a similar amount of information content to an amount of information of the command.

11. A computer system as in claim 10, wherein said second interface display terminal displays information directly, without processing the information in a way to change its content.

12. A system as in claim 11, wherein said first display terminal includes a processor and a program running therein.

13. A method of operating a distributed system, comprising:

operating a first part of a computer program in a computer system for performing a first application;

operating a second, independent part of the computer program in a terminal device for performing the first application; and communicating a command from the first part of the computer program to the terminal device; and the second part of the computer program performing an action in response to the command in the terminal device based on information stored in the terminal device.

14. The method of claim 13, wherein the action performed in the terminal device includes an input/output operation.

15. The method of claim 13, wherein the terminal device includes a display, the command includes a display command, and the action performed in the terminal device includes displaying data on the display, and wherein the data communicated in the display command is less in amount than the data displayed.

16. The method of claim 13, wherein the terminal device includes a display connected to a pointer device, the method further comprising:

determining, in the terminal device, coordinates on the display of the pointer device upon activation of the pointer device.

17. The method of claim 16, further comprising:

storing graphical information in the terminal device representing programs that can be executed.

18. The method of claim 16, further comprising:

the second part of the computer program transmitting a command indicating activation of the pointer device at the determined coordinates on the display rather than continuously transmitting intermediate coordinates of the pointer device.

19. The method of claim 13, wherein the terminal device includes a display, the method further comprising:

the first part of the computer program performing one or more of the following tasks: data processing, file storage, and interfacing with a network; and the second part of the computer program performing one or more of the following tasks: creating images on the display, formatting screens on the display, and determining positions on the display.

20. A computer system, comprising:

a base computer executing a first program;

a terminal unit executing a second program and including a memory, the first and second programs forming separate and independent parts of an operating software; and a communication link between the base computer and the terminal unit over which the first program transmits an instruction level command to the terminal unit, wherein the second program is configured to respond to the command by retrieving information from the terminal unit memory and performing an action in the terminal unit.

21. The computer system of claim 19, wherein the terminal unit includes a display.

22. The computer system of claim 21, wherein the action performed in the terminal unit includes displaying data on the display, and wherein data transmitted in the command from the base computer to the display is less in amount than the data displayed.

23. The computer system of claim 19, wherein the first program and second program communicate instruction level commands between each other.

24. The computer system of claim 19, wherein the terminal unit includes a display connected to a pointer device, and wherein the second program is configured to determine coordinates on the display of the pointer device upon activation of the pointer device.

25. The computer system of claim 24, wherein graphical information representing programs that can be executed is stored in the terminal unit memory.

26. The computer system of claim 25, wherein the graphical information includes icons.

27. The computer system of claim 25, wherein the graphical information includes menus and their contents.

28. The computer system of claim 24, wherein the second program is configured to transmit a command indicating activation of the pointer device at the determined coordinates on the display rather than continuously transmitting intermediate coordinates of the pointer device.

29. The computer system of claim 19, wherein the second program is configured to process information and to transmit an instruction level command to the computer system over the communication link based on the processed information.

30. The computer system of claim 29, wherein the first program is configured to respond to an instruction level command received from the second program by transmitting another instruction level command back to the terminal unit.

* * * * *